US012608038B2

(12) United States Patent　　Kakkireni et al.

(10) Patent No.:　US 12,608,038 B2
(45) Date of Patent:　Apr. 21, 2026

(54) GLOBAL COUNTER SAVE AND RESTORE

(71) Applicant: QUALCOMM INCORPORATED, San Diego, CA (US)

(72) Inventors: Prashanth Kumar Kakkireni, Bengaluru (IN); Naveen Kumar Narala, Bengaluru (IN); Amod Phadke, Bangalore (IN); Arun Gothekar, Hyderabad (IN); Anirudh Ghayal, Secunderabad (IN)

(73) Assignee: Qualcomm Incorporated, San Diego, CA (US)

( * ) Notice: Subject to any disclaimer, the term of this patent is extended or adjusted under 35 U.S.C. 154(b) by 140 days.

(21) Appl. No.: 18/476,111

(22) Filed: Sep. 27, 2023

(65) Prior Publication Data

US 2025/0103092 A1　　Mar. 27, 2025

(51) Int. Cl.
| *G06F 1/04* | (2006.01) |
| *G06F 1/10* | (2006.01) |
| *G06F 1/12* | (2006.01) |
| *G06F 1/3287* | (2019.01) |
| *G06F 5/06* | (2006.01) |
| *G06F 15/78* | (2006.01) |

(52) U.S. Cl.
CPC .............. *G06F 1/10* (2013.01); *G06F 1/3287* (2013.01); *G06F 15/7807* (2013.01)

(58) Field of Classification Search
CPC ....... G06F 1/10; G06F 1/3287; G06F 15/7807
See application file for complete search history.

(56) References Cited

U.S. PATENT DOCUMENTS

| 6,584,542 | B1 * | 6/2003 | Weigand | ............. | G06F 9/30185 |
| | | | | | 711/127 |
| 10,863,437 | B1 * | 12/2020 | Noh | .................... | H04L 27/2603 |
| 2004/0168098 | A1 * | 8/2004 | Matsuoka | ........... | G06F 11/0757 |
| | | | | | 714/E11.003 |
| 2008/0056422 | A1 * | 3/2008 | Rao | ..................... | H04W 52/029 |
| | | | | | 375/357 |
| 2010/0005332 | A1 * | 1/2010 | Simon | ....................... | G06F 1/12 |
| | | | | | 713/400 |
| 2012/0317427 | A1 * | 12/2012 | Cesare | .................. | G06F 1/3203 |
| | | | | | 713/300 |
| 2013/0318383 | A1 * | 11/2013 | Takizawa | .............. | G06F 1/3234 |
| | | | | | 713/323 |
| 2019/0278496 | A1 * | 9/2019 | Rowley | ................. | G06F 3/0679 |
| 2021/0406207 | A1 * | 12/2021 | Narala | ................ | G06F 13/1689 |
| 2022/0244756 | A1 * | 8/2022 | Nguyen | ............. | G06F 15/7807 |
| 2024/0414646 | A1 * | 12/2024 | Ujikawa | ............... | H04W 52/02 |

* cited by examiner

*Primary Examiner* — Xuxing Chen
(74) *Attorney, Agent, or Firm* — Smith Tempel Blaha LLC

(57) ABSTRACT

A global count or reference time in a computing device may be maintained during a sleep state in which the global counter is powered off. The global count from the global counter may be saved in a register when the sleep state is entered. When the sleep state is exited, the global count in the register may be restored in the global counter.

12 Claims, 5 Drawing Sheets

GLOBAL COUNTER SAVE AND RESTORE

DESCRIPTION OF THE RELATED ART

A computing device may include components such as processors, memory, input and output components, etc. Wireless computing devices may also include radio transceivers. The multiple components may be integrated on a "system-on-a-chip" ("SoC"). Mobile computing devices, such as cellular handsets, automotive computing devices, so-called "Internet-of-Things" ("IoT") devices, etc., may include SoCs. As mobile computing devices may be battery powered, they may incorporate power-saving techniques. A common power-saving technique involves placing the SoC into a low-power mode when conditions indicate that the goal of saving power outweighs the competing goal of high processing performance. There may be multiple low-power modes from among which the computing device's power management controller can select to achieve different balances or tradeoffs between power conservation and performance.

During a period of inactivity or low activity in a computing device, the device or its SoC may enter a low-power state known as a "sleep" state. There may be multiple sleep states, i.e., a range of sleep states, from among which a sleep state can be selected depending upon the degree of inactivity. In a deep-sleep state, corresponding to a high degree of inactivity, essentially all SoC subsystems or components may be powered off.

A global counter is an example of an SoC component that may be powered off during a deep-sleep state. The global counter may provide an SoC-wide reference count or time. The global count maintained by the global counter may represent, in effect, how long the SoC has been powered on. When the deep-sleep state is exited and the global counter is powered back on, the global counter may reset, i.e., the reference count or time may reset to zero. Various software entities operating on SoC processors may rely on the global count for proper operation. For example, a second software entity may schedule a second task to be performed some amount of time after a first software entity completes a first task. If the global count is reset due to entry into a deep-sleep state between the time the first task is completed and the second task is to be begun, when the deep-sleep mode is exited and the global counter is powered back on the second software entity may be unaware of the reset of the global count and therefore fail to perform the second task.

SUMMARY OF THE DISCLOSURE

Systems, methods, and other examples for maintaining a global count during a sleep state in a computing device are disclosed.

An exemplary method for maintaining a global count during a sleep state in a computing device may include receiving an indication of entry into the sleep state. The exemplary method may further include storing a value from a global counter in a register in response to the indication of the entry into the sleep state. During the sleep state the global counter may be unpowered. The exemplary method may still further include receiving an indication of exit from the sleep state. The exemplary method may yet further include storing the value from the register in the global counter in response to the indication of the exit from the sleep state.

An exemplary system for maintaining a global count during a sleep state in a computing device may include a register and control circuitry. The control circuitry may be configured to receive an indication of entry into the sleep state. The control circuitry may further be configured to store a value from a global counter in the register in response to the indication of the entry into the sleep state. The control circuitry may still further be configured to receive an indication of exit from the sleep state. The control circuitry may yet further be configured to store the value from the register in the global counter in response to the indication of the exit from the sleep state.

A system-on-a-chip (SoC) may include at least one processor, a global counter, a register, global counter control circuitry, and two or more power domains. A first one of the power domains may supply the global counter, and a second one of the power domains may supply the register. During the sleep state the global counter may be unpowered, but the register may be powered. The control circuitry may be configured to receive an indication of entry into the sleep state. The control circuitry may further be configured to store a value from the global counter in the register in response to the indication of the entry into the sleep state. The control circuitry may still further be configured to receive an indication of exit from the sleep state. The control circuitry may yet further be configured to store the value from the register in the global counter in response to the indication of the exit from the sleep state.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
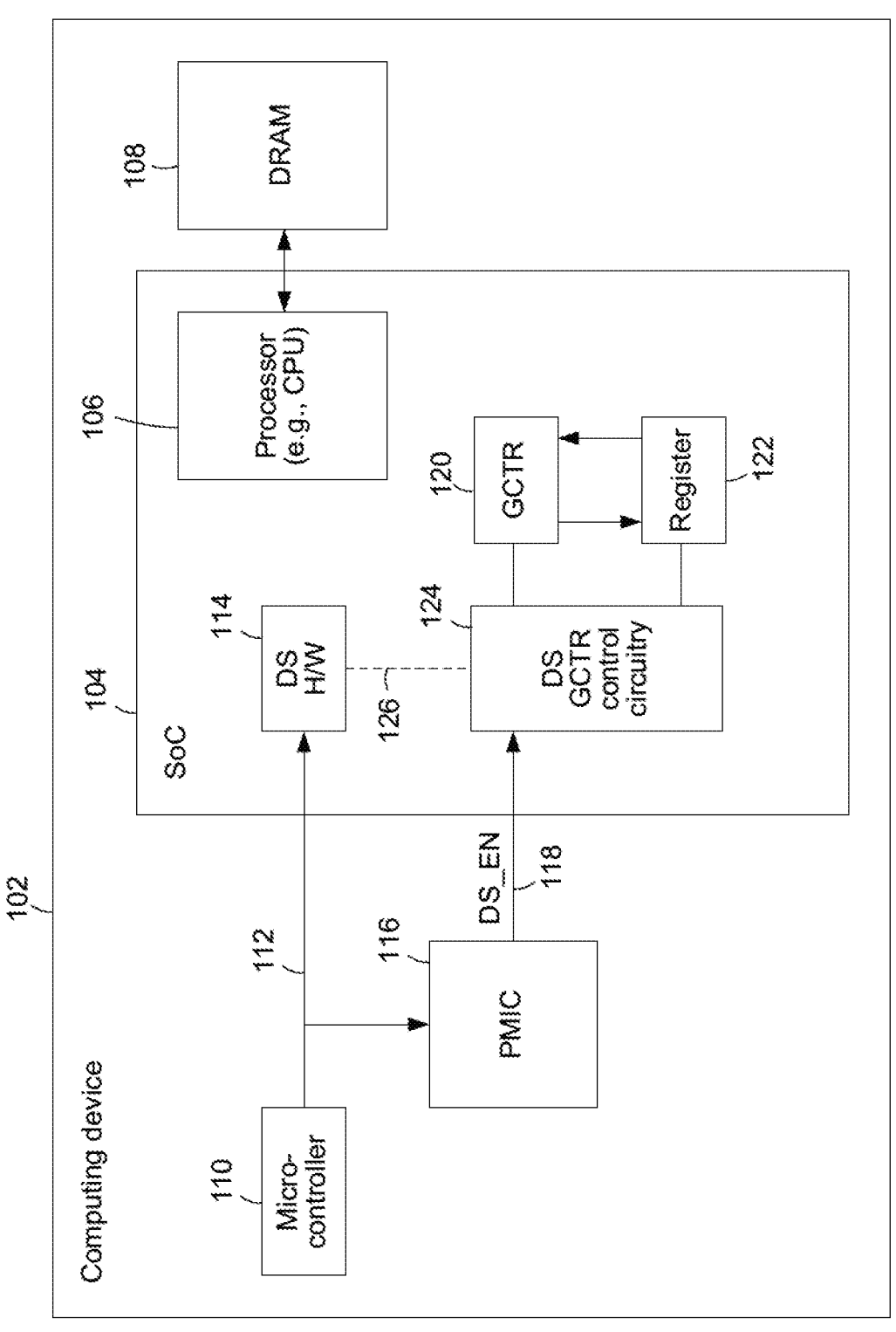
FIG. 1 is a block diagram of a portion of a computing device in which a global count may be maintained during a sleep state, in accordance with exemplary embodiments.

As shown in FIG. 1, in an illustrative or exemplary embodiment a computing device 102 may include a system-on-a-chip or "SoC" 104. The SoC 104 may include one or more processors 106, such as, for example, a central processing unit ("CPU"). The SoC 106 may be coupled to one or more memories, such as, for example, a dynamic random access memory ("DRAM") 108. The DRAM 108 may be, for example, double data-rate synchronous DRAM ("DDR-SDRAM" or, for brevity, "DDR"). The processor 106 may, through the execution of software or firmware (not shown), perform operations such as writing data to and reading data from the DRAM 108. The processor 106 may be one of various types of processors or subsystems of the SoC 104, others of which are not shown in FIG. 1 for purposes of clarity. For example, although not shown, the SoC 104 may include a DRAM controller through which the processor 106 may perform memory transactions with the DRAM 108.

The computing device 102 may be, for example, an automotive computing device, an Internet-of-Things ("IoT") device, etc. Accordingly, the computing device 102 may be battery-powered and implement techniques for conserving power, such as low-power states or sleep states. For example, the computing device 102 may include a microcontroller 110 coupled to the SoC 104 that is configured to detect a condition of low activity corresponding to a deep-sleep state. The microcontroller 110 may provide an indication or signal 112 when, for example, the microcontroller 110 determines that the computing device 102 is not being used or is not performing any tasks. In an example in which the computing device 102 is used in controlling an automobile (not shown), the microcontroller 110 may be coupled to various sensors configured to detect conditions of inactivity of the automobile, such as when the automobile is parked. Although in the illustrated example the microcontroller 110 detects the condition of low activity and provides the indication or signal 112, in other examples software executing on the processor 106 may detect the condition of low activity and "self-initiate" entry into the deep sleep state.

The SoC 104 may include deep-sleep ("DS") circuitry or hardware 114 configured to control aspects of the deep-sleep state in response to the signal 112 from the microcontroller 110, such as aspects of entering the SoC 104 into the deep-sleep state and exiting the SoC 104 from the deep-sleep state. Although in the illustrated example the indication or signal 112 may be a hardware signal, in other examples the microcontroller 110 may send a message (i.e., a software-based communication) to the processor 106 to indicate a condition of low activity. Although not shown in FIG. 1 for purposes of clarity, the computing device 102 may include still other circuitry (e.g., within the SoC 104) for selecting or otherwise controlling sleep states. The sleep states may correspond to varying degrees of inactivity of the computing device 102 or its systems or subsystems. In sleep states corresponding to lower degrees of inactivity, a small amount of system or subsystem circuitry may be powered off, and may be prepared to be quickly powered on and returned to fully operational mode when activity increases. In sleep states corresponding to higher degrees of inactivity, a greater amount of system or subsystem circuitry may be powered off, and may take longer to power on and return to fully operational mode when activity increases. In the example described herein with regard to FIG. 1, the deep-sleep state may correspond to the highest degree of inactivity. In this example, when the SoC 104 is in the deep-sleep state, all SoC subsystems may be powered off except as described below. When the SoC 104 is in the deep-sleep state, the DRAM 108 may be placed in a self-refresh mode instead of receiving commands from a DRAM controller (not shown) in the SoC 104 because such a DRAM controller may be powered off when the SoC 104 is in the deep-sleep state. Although the deep-sleep state is used herein as an example of a sleep state to which the solutions described herein may be applied, the solutions may be applied to other sleep states.

The computing device 102 may further include a power management integrated circuit or "PMIC" 116. The PMIC 116 may supply multiple power supply rails (not shown) to the SoC 104 to power various SoC subsystems and components. The multiple power rails may also be referred to as power domains and can be individually controlled by the PMIC 116 based on the power state (e.g., low-power state). The PMIC 116 may control the power rails in response to the above-described signal 112 as well as other signals (not shown). When the SoC 104 determines that the signal 112 is asserted (or in other examples, when the processor 106 self-initiates deep sleep), the SoC 104 may complete any necessary "housekeeping" tasks and then send a signal (from, e.g., the deep-sleep hardware 114) to the PMIC 116, indicating that the deep-sleep state may be entered. The PMIC 116 may then power down one or more power rails (not shown) supplying the SoC 104 or other components and assert a deep-sleep enable ("DS_EN") signal 118. The SoC 104 may respond to the assertion of the DS_EN signal 118 by entering into the deep-sleep state. An example of such a sequence of operations relating to entry into the deep-sleep state is as described below with regard to FIG. 4.

The SoC 104 may include a Global Counter ("GC" or "GCTR") 120. The Global Counter 120 may provide an SoC-wide (i.e., "global") reference count or time, referred to herein as the global count. Like other SoC subsystems or components, the Global Counter 120 may be powered off when the SoC 104 is in the deep-sleep state. SoC subsystems may rely on the global count to synchronize or time various tasks. For example, a software entity (not shown) executing on the processor 106 may schedule a task to be performed some amount of time after another software entity (not shown) completes another task. If the global count is reset due to entry into a deep-sleep state between the time the first task is completed and the second task is to be begun, when the deep-sleep mode is exited the second software entity may be unaware of the reset and therefore fail to perform the second task or not perform the second task at the correct time in relation to other tasks. The solutions described herein may mitigate this potential problem. In one aspect of such solutions, the SoC 104 may include a register 122 and deep-sleep global counter control circuitry 124 (also referred to herein for brevity as control circuitry 124).

The control circuitry 124 may be configured to receive an indication of entry into the deep-sleep state. Such an indication of entry into the deep-sleep state may comprise an assertion of the DS_EN signal 118 provided by the PMIC 116 or a signal derived from the DS_EN signal 118. Alternatively, or in addition, such an indication of entry into the deep-sleep state may be provided by the deep-sleep circuitry or hardware 114, as conceptually indicated by the path 126.

The control circuitry 124 may further be configured to obtain the value from the Global Counter 120 (i.e., the global count) and store it in the register 122 in response to the indication of the entry into the deep-sleep state. The SoC 104 may then enter the deep-sleep state. In the illustrated example, because the Global Counter 120 is unpowered during the deep-sleep state, the Global Counter 120 cannot maintain the global count during the deep-sleep state. That is, the value in the Global Counter 120 may become zero or an undefined value when power is removed from the Global Counter 120 and then restored.

The control circuitry 124 may also be configured to receive an indication of exit from the deep-sleep state. Such an indication of exit from the deep-sleep state may be de-assertion of the DS_EN signal 118 provided by the PMIC 116 or a signal derived from the DS_EN signal 118. Alternatively, or in addition, such an indication of exit from the deep-sleep state may be provided by the deep-sleep circuitry or hardware 114.

The control circuitry 124 may be configured to obtain the value from the register 122 and store it in the Global Counter 120 in response to the indication of exit from the deep-sleep state. The value from the register 122 may be stored in the Global Counter 120 after power is restored to the Global Counter 120.

Figure 2:
FIG. 2 is a block diagram of a system for maintaining a global count during a sleep state, in accordance with exemplary embodiments.

As illustrated in FIG. 2, a system 200 for maintaining a global count during a deep-sleep state may involve two or more SoC power domains, such as a first power domain 202 and a second power domain 204. In the illustrated example, the first power domain 202 may supply power to a relatively small set of SoC components that provide core SoC functions that remain operational or functional in all sleep states except the deep-sleep state, i.e., the deepest sleep state. The first power domain 202 may accordingly sometimes be referred to as an "always-on" power domain or subsystem, because it remains on (almost) always, the notable exception being the deep-sleep state.

Components in the first power domain 202 may include a Global Counter 205, which may be an example of the Global Counter 120 described above with regard to FIG. 1. The Global Counter 205 may have any size, such as, for example 32 or 64 bits. The Global Counter 205 may increment by one in response to each cycle of a clock signal (not shown). Other components in the first power domain 202 that may relate to the solutions described herein may include deep-sleep global counter logic 206, a global counter save/restore enable register 208, and a Gray Code converter 210. The deep-sleep global counter logic 206 may be an example of a portion of the deep-sleep global counter control circuitry 124 described above with regard to FIG. 1. The subsystem powered by the first power domain 202 may include various other components that are not related to the solutions described herein and are therefore not shown in FIG. 2 for purposes of clarity. As noted above, such other components may relate to core SoC functions, such as security, but alternatively, or in addition, such other components may relate to other SoC functions.

A global count register 212 and a global count restore enable register 214 may be included in the second power domain 204. The global count register 212 and the global count restore enable register 214 thus may be supplied with power independently from the Global Counter 205 and other components in the first power domain 202. The global count register 212 may be an example of the register 122 described above with regard to FIG. 1. In such an example, the second power domain 204 may be the same power domain that supplies the DRAM 108 (FIG. 1) when the DRAM 108 is in self-refresh mode during the deep-sleep state.

The deep-sleep global counter logic 206 may be configured to load a saved or stored global count from the global count register 212 into the Global Counter 205. The deep sleep global counter logic 206 may receive a DS_Status signal that indicates to enable this loading operation only when exiting the deep sleep state and not when exiting other sleep states. That is, the DS_Status signal is asserted only in the deep sleep state and remains de-asserted at other times (e.g., in other sleep states). The Gray Code converter 210 may be configured to convert the global count provided by the Global Counter 205 from a binary format to a Gray Code format for storage in the global count register 212. Storing the global count in Gray Code format rather than binary format may save power because fewer bits may be required to switch states. It should be understood that although in the illustrated example the global count is converted to and from Gray Code format, in other examples such conversion may be omitted. That is, the global count may be stored in the global count register 212 in the same format in which the global count is used by the Global Counter 205.

The system 200 may include voltage level shifters 216, 218, 220 and 222. The level shifters 216-222 may be interposed in signal paths between components in different power domains.

The level shifter 216 may be coupled between the output of the Gray Code converter 210 and the input of the global count register 212. The level shifter 216 may have the same bit width as the global count, such as, for example, 32 or 64 bits. The level shifter 216 may have a clamp input configured to receive the deep-sleep enable signal DS_EN. When the deep-sleep enable signal DS_EN is asserted (e.g., a value of "1"), the level shifter 216 may clamp the Gray Code format global count at the voltage level of the second power domain 204, so that the global count may be stored or saved in the global count register 212, which is supplied by the second power domain 204.

The level shifter 218 may be coupled between the output of the global count save/restore enable register 208 and the input of the global count restore enable register 214. The global count save/restore enable register 208 may be configured to store a single bit that indicates whether the global count save/restore feature described herein, by which the global count is saved when the deep-sleep state is entered and restored when the deep-sleep stated is exited, is enabled or disabled. Note that the global count save/restore feature is enabled to provide the operation described herein. If the global count save/restore feature is disabled, then the global count may not be maintained during the deep-sleep state. Software (not shown) executing on a processor (e.g., the processor 106 (FIG. 1)) may set the value in the register 208 to "1" to enable the global count save/restore feature and to "0" to disable the global count save/restore feature. Accordingly, the level shifter 218 may have a single-bit width. The level shifter 218 may have a clamp input configured to receive the deep-sleep enable signal DS_EN. When the deep-sleep enable signal DS_EN is asserted (e.g., a value of "1"), the level shifter 218 may clamp the bit value stored in the global count save/restore enable register 208 at the voltage level of the second power domain 204, so that that bit value may be stored or saved in the global count restore enable register 214, which is supplied by the second power domain 204.

A global count restore register 224 may be included to provide a fallback feature. Alternatively to the hardware-based restoration of the saved global count to the Global Counter 205 in response to the deep-sleep enable signal DS_EN indicating an exit from the deep-sleep state, software (e.g., executing on the processor 106 (FIG. 1)) may access the global count restore register 224 to load a global count into the Global Counter 205. The global count restore register 224 may have a size (width) of the same size as the global count, such as, for example 32 or 64 bits. The global count restore register 224 may be supplied by yet another power domain 226, which may be, for example, the same power domain supplying the processor 106.

Figure 3:
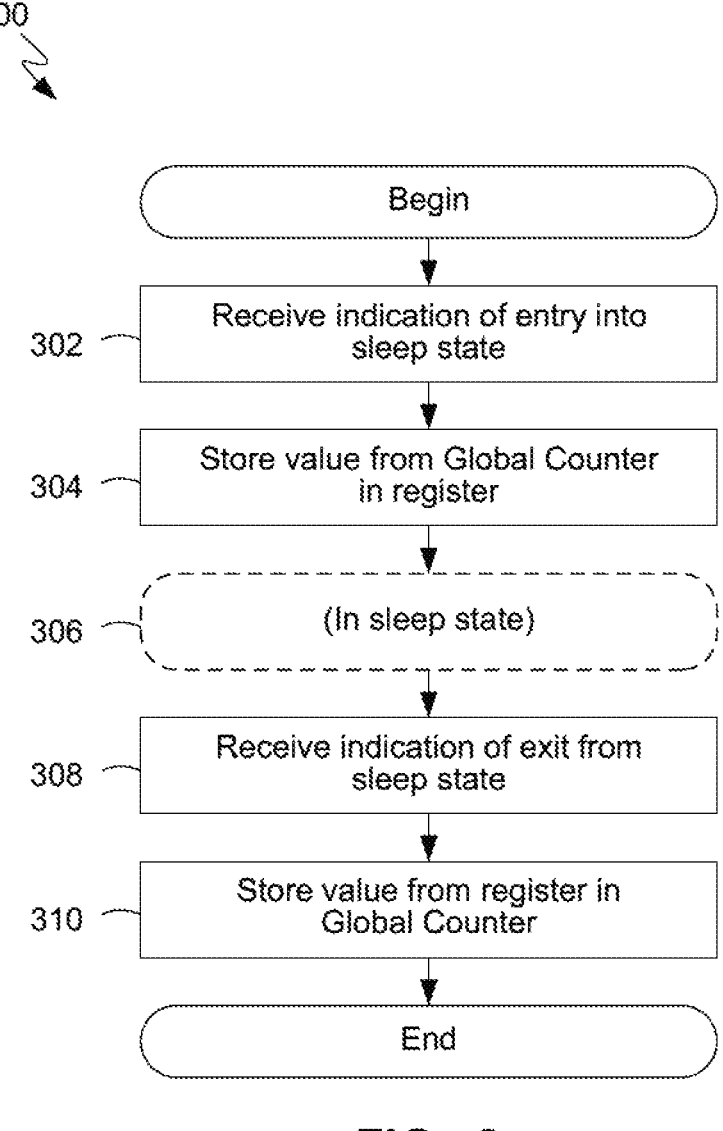
FIG. 3 is a flowchart illustrating a method for maintaining a global count during a sleep state, in accordance with exemplary embodiments.

In FIG. 3, a method 300 for maintaining a global count during a sleep state in a computing device is shown in flowchart form. As indicated by block 302, an indication of entry into a sleep state may be received. Once entry into the sleep state is completed, the global counter may be unpowered and no longer maintain the global count. Accordingly, the value from the global counter may be saved in a register before entry into the sleep state is completed, as indicated by block 304. The sleep state is indicated by block 306. In the deep sleep state, the register may remain powered, preserving the global count.

As indicated by block 308, an indication of exit from the sleep state may be received. Once exit from the sleep state is completed, power may be restored to the global counter, enabling the global counter to continue to maintain the global count. The value from the register may be stored in the global counter in response to the indication of exit from the sleep state, as indicated by block 310. The global counter may then resume counting, beginning from the global count that was loaded into the global counter from the register.

With reference to the exemplary computing device 102 (FIG. 1), the indication of entry into the sleep state may be an assertion of the DS_EN signal 118 received from the PMIC 116. In the context of the exemplary computing device 102, the sleep state may be referred to as a deep-sleep state, which may be the deepest of multiple sleep states, and in which the computing device's DRAM 108 (FIG. 1) is no longer refreshed by a memory controller (not shown) in the SoC 104 but rather is operated in a self-refresh mode. Nevertheless, in other examples the sleep state during which the global count is saved may be a different sleep state.

With reference to the system 200 of FIG. 2, the assertion of the DS_EN signal may enable the global count register 212 to clock into it the Gray Code format global count. The assertion of the DS_EN signal may also enable the global count restore enable register 214 to clock into it a bit value (e.g., "1") that indicates the global count save/restore feature is enabled.

In the exemplary computing device 102, the SoC 104 may remain in the deep-sleep state until an indication of exit from the deep-sleep state occurs. De-assertion of the DS_EN signal may indicate exit from the deep-sleep state. Other indications of exit from the deep-sleep state may include powering-up of the first power domain 202 and, accordingly, the deep-sleep global counter logic 206 becoming operational. The bit value stored in the global count restore enable register 214 may enable operation of the deep-sleep global counter logic 206. In operation, the deep-sleep global counter logic 206 may capture the global count from the global count register 212. The deep-sleep global counter logic 206 may also convert the captured global count from Gray Code format to binary format. The deep-sleep global counter logic 206 may temporarily halt or disable the Global Counter 205 from counting (i.e., incrementing) while the deep-sleep global counter logic 206 loads the binary format global count into the Global Counter 205. Following such loading of the global count, the deep-sleep global counter logic 206 may re-enable the Global Counter 205 to continue counting, beginning from the loaded global count.

Figure 4:
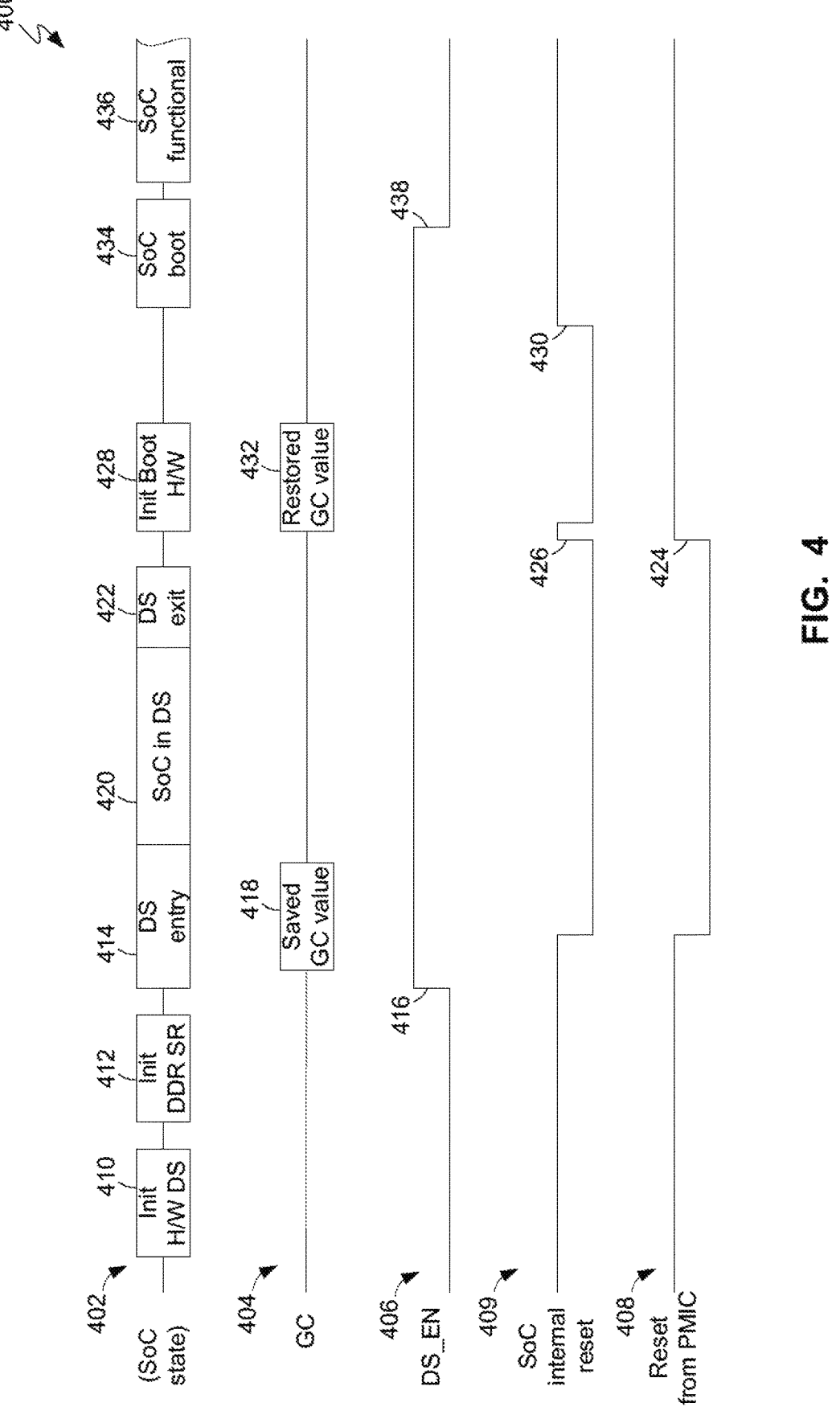
FIG. 4 is a timing diagram illustrating aspects of entry into and exit from a sleep state in relation to a global count, in accordance with exemplary embodiments.

In FIG. 4, a timing diagram 400 illustrates an example of saving a global count upon entry into a deep-sleep mode and restoring the global count upon exit from the deep-sleep mode in the above-described computing device 102 (FIG. 1) and system 200 (FIG. 2). The timing diagram 400 includes the SoC state 402 relevant to deep-sleep entry and exit, a global counter value 404 (also referred to as a global count), the DS_EN signal 406, and two reset signals 408 and 409. The reset signal 408 may be a signal provided to the SoC 104 from the PMIC 116 (FIG. 1), while the reset signal 409 may be a signal internal to the SoC 104 that is derived from the reset signal 408.

Entry into the deep-sleep state may begin with initialization 410 of deep-sleep hardware 114 in the SoC 104 (FIG. 1) in response to, for example, the signal 112 from the microcontroller 110. Then, the SoC 104 may perform an initialization 412 of the DRAM 108 (also referred to as DDR) that transitions the DRAM 108 to the self-refresh mode. The SoC 104 may also perform other functions in association with the entry 414 into the deep-sleep state.

While the SoC 104 (FIG. 1) is entering the deep-sleep state, the PMIC 116 (FIG. 1) may assert 416 the DS_EN signal 406. In response to this assertion 416 (e.g., a rising edge) of the DS_EN signal 406, the global count may be saved 418 from the Global Counter 205 (FIG. 2) into the global count register 212 (FIG. 2). At the conclusion of the deep-sleep entry 414, the SoC 104 will be in the deep-sleep state 420. The SoC 104 may begin a deep-sleep exit 422 in response to, for example, the PMIC 116 powering up the first power domain 202 (FIG. 2) and other power domains that had been powered down during the deep-sleep state.

A rising edge 424 of the reset signal 408 from the PMIC 116 (FIG. 1) may indicate that the SoC 104 (FIG. 1) is to begin resetting. Circuitry (not shown) in the SoC 104 may provide the reset signal 409 based on the reset signal 408. A rising edge 426 of the reset signal 409 may initialize boot hardware (not shown) in the SoC 104, as indicated by the SoC boot hardware initialization 428. This first rising edge 426 may also trigger loading of the global count that had been saved (as described above) in the global count register 212. In other words, the saved global count is restored in the Global Counter 205, as indicated by the restored global counter value 432. The Global Counter 205 may then continue counting, beginning from the restored global counter value 432. Booting 434 of the SoC 104 may begin in response to a second rising edge 430 of the reset signal 409. When the booting 434 is completed, the SoC 104 may be in a fully functional state 436 (sometimes referred to as mission mode). The PMIC 116 (FIG. 1) may de-assert 438 the DS_EN signal 406 during SoC booting.

Figure 5:
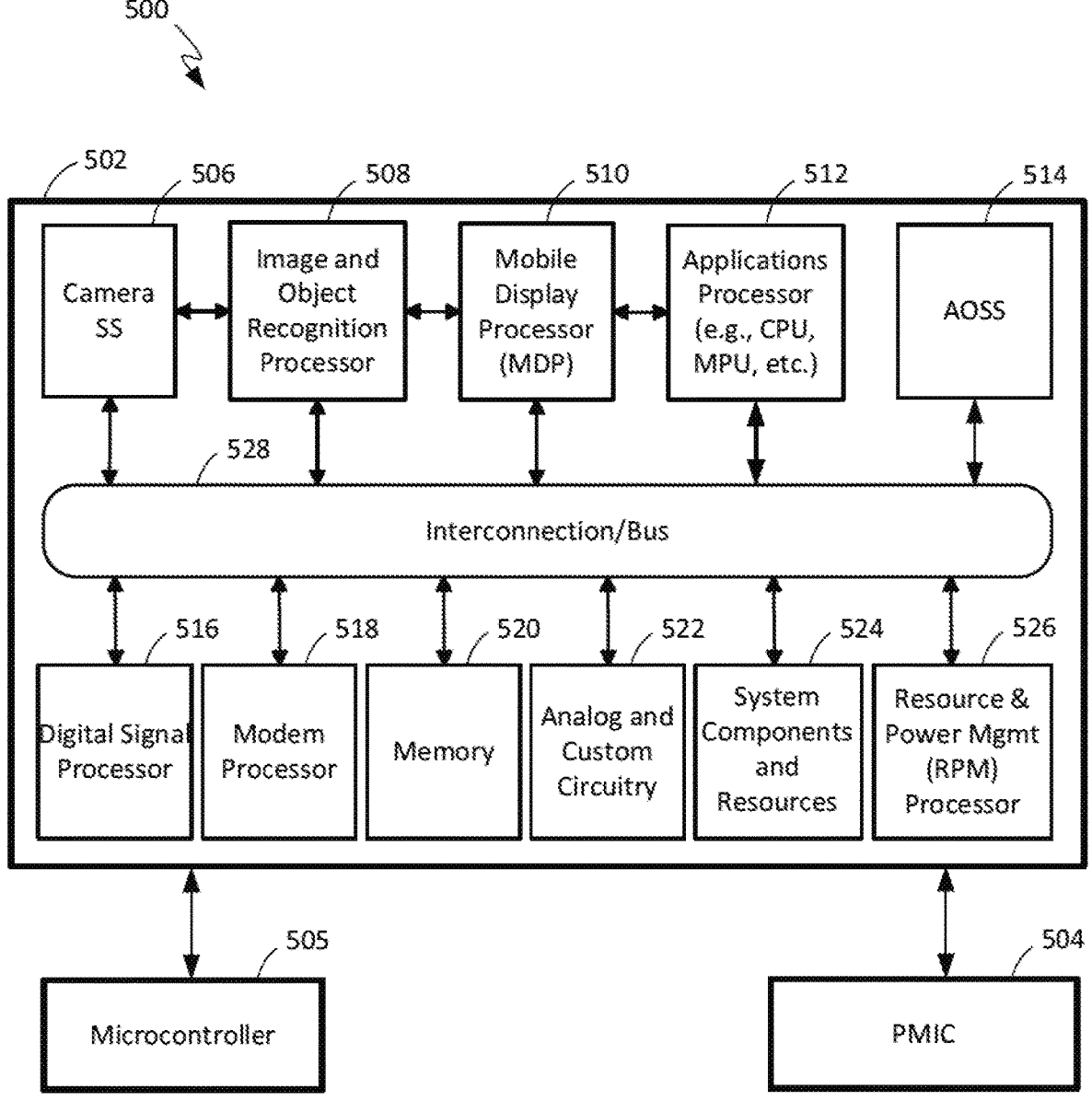
FIG. 5 is a block diagram of a computing device having a system for maintaining a global count during a sleep state, in accordance with exemplary embodiments.

As shown in FIG. 5, in an illustrative or exemplary embodiment, systems, methods and other examples for maintaining a global count during a sleep state may be provided in an automotive computing device 500. The computing device 500 may be included in an autonomous (self-driving), semi-autonomous, etc., automobile or other automotive vehicle (not shown). The automotive computing device 500 may include an SoC 502, a PMIC 504, and a microcontroller 505, along with various other components that are not shown for purposes of clarity.

The microcontroller 505 may be coupled to various sensors (not shown) and may be configured to detect, among other conditions, conditions for a deep-sleep state. For example, the microcontroller 505 may detect when the automobile is parked and not operational.

The SoC 502 may include a camera subsystem 506, an image and object recognition processor 508, a mobile display processor ("MDP") 510, an applications processor (e.g., CPU) 512, and a so-called always-on subsystem ("AOSS") 514. The image and object recognition processor 508 may be coupled to the camera subsystem 506 and the MDP 510. In an exemplary embodiment, the camera subsystem 506, the image and object recognition processor 508, and the MDP 510 may cooperate to provide a visual display to an automobile operator (not shown).

Although not separately shown for purposes of clarity, the AOSS 514 may include a global counter and related circuitry as described above, in addition to other components that may remain powered during all sleep states except the deep-sleep state, such as, for example, components relating to security.

The SoC 502 may further include a digital signal processor (DSP) 516, a modem processor 518, a memory 520, analog and custom circuitry 522, system components and resources 524, and a resource and power management (RPM) processor 526. In an exemplary embodiment, each of the elements in the SoC 502 may be connected to a bus or system interconnect 528. Although in the illustrated embodiment the components 506-526 are located in the same SoC 502, in other embodiments such components may be distributed among multiple chips (e.g., chiplets). The solutions described herein may be beneficial in a chiplet implementation. Absent the solutions described herein, attempting to synchronize a global count across multiple chiplets may present challenges.

The modem processor 518 may provide wireless connectivity. The memory 520 may be an example of the above-described DRAM 108. The analog and custom circuitry 522 may provide analog signal processing. The system components and resources 524 may provide various signal processing and signal conditioning circuitry including, for example, voltage regulators, oscillators, phase-locked loops, peripheral memory controllers, memory controllers, system controllers, access ports, timers, and other components used to support processors and software clients. Although not separately shown for purposes of clarity, the analog and custom circuitry 522 may include a register configured to store the global count from the global counter during the deep-sleep state, as described above.

The RPM processor 526 may manage power modes, including sleep states, for power conservation and performance. The RPM processor 526 and PMIC 504 may operate together to control aspects of supplying power to SoC components when sleep states are entered and exited.

It should be understood that the automotive computing device 500 is only an example of a computing device in which systems, methods and other examples of maintaining a global count during a sleep state may be provided. Other examples may include other types of IoT devices, such as industrial and agricultural sensors and controllers, electric or water utility meters, household devices such as smart thermostats, smart garage door openers, etc., and wearables such as wristwatch-style and eyewear-style devices.

Implementation examples are described in the following numbered clauses.

1. A method for maintaining a global count during a sleep state in a computing device, comprising:
receiving, by control circuitry, an indication of entry into the sleep state;
storing, by the control circuitry, a value from a global counter in a register in response to the indication of the entry into the sleep state, wherein during the sleep state the global counter is unpowered;
receiving, by the control circuitry, an indication of exit from the sleep state; and
storing, by the control circuitry, the value from the register in the global counter in response to the indication of the exit from the sleep state.

2. The method of clause 1, further comprising supplying the register with power during the sleep state.

3. The method of clause 1 or 2, wherein the control circuitry and the register are included in a system-on-a-chip (SoC).

4. The method of any of clauses 1-3, wherein supplying the register with power comprises supplying the register with power from a power domain supplying power to a dynamic random access memory coupled to the SoC in a self-refresh mode during the sleep state.

5. The method of any of clauses 1-4, wherein:
receiving the indication of entry into the sleep state comprises receiving the indication of entry from a power management integrated circuit (PMIC) coupled to the SoC; and
receiving the indication of exit from the sleep state comprises receiving the indication of exit from the PMIC.

6. The method of any of clauses 1-5, wherein the sleep state is a deepest sleep state.

7. The method of any of clauses 1-6, further comprising:
converting the value from a binary format into a Gray Code format before storing the value in the register; and
converting the value from the Gray Code format into the binary format before storing the value in the global counter.

8. A system for maintaining a global count during a sleep state in a computing device, comprising:
a register; and
control circuitry configured to:
receive an indication of entry into the sleep state;
store a value from a global counter in the register in response to the indication of the entry into the sleep state, wherein during the sleep state the global counter is unpowered;
receive an indication of exit from the sleep state; and
store the value from the register in the global counter in response to the indication of the exit from the sleep state.

9. The system of clause 8, wherein the register is configured to be supplied with power during the sleep state.

10. The system of clause 8 or 9, wherein the control circuitry and the register are included in a system-on-a-chip (SoC).

11. The system of any of clauses 1-10, wherein the register is configured to be supplied with power from a power domain supplying power to a dynamic random access memory coupled to the SoC in a self-refresh mode.

12. The system of any of clauses 1-11, wherein:
the control circuitry is configured to receive the indication of entry into the sleep state from a power management integrated circuit (PMIC) coupled to the SoC; and
the control circuitry is configured to receive the indication of exit from the sleep state from the PMIC.

13. The system of any of clauses 1-12, wherein the sleep state is a deepest sleep state.

14. The system of any of clauses 1-13, wherein the control circuitry is further configured to:
convert the value from a binary format into a Gray Code format before the value is stored in the register; and
convert the value from the Gray Code format into the binary format before the value is stored in the global counter.

15. A system-on-a-chip (SoC), comprising:
at least one processor;
a global counter;
a register;
global counter control circuitry; and
a plurality of power domains, including a first power domain supplying the global counter and a second power domain supplying the register, wherein during a sleep state the first power domain is off and the second power domain is on;

wherein the global counter control circuitry is configured to:

receive an indication of entry into the sleep state;

store a value from the global counter in the register in response to the indication of the entry into the sleep state;

receive an indication of exit from the sleep state; and store the value from the register in the global counter in response to the indication of the exit from the sleep state.

16. The system of clause 15, wherein the SoC is coupled to a dynamic random access memory (DRAM) configured to be supplied by the second power domain when the DRAM is in a self-refresh mode during the sleep state.

17. The system of clause 15 or 16, wherein:

the global counter control circuitry is configured to receive the indication of entry into the sleep state from a power management integrated circuit (PMIC) coupled to the SoC; and the global counter control circuitry is configured to receive the indication of exit from the sleep state from the PMIC.

18. The system of any of clauses 1-17, wherein the sleep state is a deepest sleep state.

19. The system of any of clauses 1-18, wherein the global counter control circuitry includes deep-sleep global counter control circuitry configured to:

convert the value from a binary format into a Gray Code format before the value is stored in the register; and convert the value from the Gray Code format into the binary format before the value is stored in the global counter.

20. The system of clause 19, wherein the deep-sleep global counter control circuitry is configured to be supplied by the first power domain and further configured to:

capture the value from the register in response to a restoration of power to the first power domain;

convert a captured value from the Gray Code format into the binary format after the restoration of power to the first power domain;

disable the global counter after the restoration of power to the first power domain;

load the value in the binary format into the global counter; and enable the global counter to continue counting from a loaded value.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for maintaining a global count during a sleep state in a computing device, comprising:

receiving, by control circuitry, an indication of entry into the sleep state;

storing, by the control circuitry, a value from a global counter in a register in response to the indication of the entry into the sleep state, wherein during the sleep state the global counter is unpowered; wherein the control circuitry and the register are included in a system-on-a-chip (SoC);

supplying the register with power during the sleep state;

receiving, by the control circuitry, an indication of exit from the sleep state;

storing, by the control circuitry, the value from the register in the global counter in response to the indication of the exit from the sleep state; wherein the control circuitry includes deep-sleep global counter control circuitry, converting, by the deep-sleep global counter control circuitry, the value from a binary format into a Gray Code format before storing the value in the register;

converting, by the deep-sleep global counter control circuitry, the value from the Gray Code format into the binary format before storing the value in the global counter;

capturing, by the deep-sleep global counter control circuitry, the value from the register in response to a restoration of power and exit from the sleep state;

converting, by the deep-sleep global counter control circuitry, the value in the register from the Gray Code format into the binary format after the restoration of power and exit from the sleep state;

disabling, by the deep-sleep global counter control circuitry, the global counter after the restoration of power and exit from the sleep state;

loading, by the deep-sleep global counter control circuitry, the value in the binary format into the global counter; and enable the global counter to continue counting from a loaded value.

2. The method of claim 1, wherein supplying the register with power comprises supplying the register with power from a power domain supplying power to a dynamic random access memory coupled to the SoC in a self-refresh mode during the sleep state.

3. The method of claim 1, wherein:

receiving the indication of entry into the sleep state comprises receiving the indication of entry from a power management integrated circuit (PMIC) coupled to the SoC; and receiving the indication of exit from the sleep state comprises receiving the indication of exit from the PMIC.

4. The method of claim 1, wherein the sleep state is a deepest sleep state.

5. A system for maintaining a global count during a sleep state in a computing device, comprising:

a register and control circuitry being included in a system-on-a-chip (SoC);

the control circuitry being configured to:

receive an indication of entry into the sleep state;

store a value from a global counter in the register in response to the indication of the entry into the sleep state, wherein during the sleep state the global counter is unpowered and the register is supplied with power during the sleep state;

receive an indication of exit from the sleep state;

store the value from the register in the global counter in response to the indication of the exit from the sleep state;

wherein the control circuitry includes deep-sleep global counter control circuitry configured to:

convert the value from a binary format into a Gray Code format before the value is stored in the register;

convert the value from the Gray Code format into the binary format before the value is stored in the global counter;

capture the value from the register in response to the indication of the exit from the sleep state;

convert the captured value from the Gray Code format into the binary format after exit from the sleep state;

disable the global counter after exit from the sleep state;

load the value in the binary format into the global counter; and enable the global counter to continue counting from a loaded value.

6. The system of claim 5, wherein the register is configured to be supplied with power from a power domain supplying power to a dynamic random access memory coupled to the SoC in a self-refresh mode.

7. The system of claim 5, wherein:

the control circuitry is configured to receive the indication of entry into the sleep state from a power management integrated circuit (PMIC) coupled to the SoC; and the control circuitry is configured to receive the indication of exit from the sleep state from the PMIC.

8. The system of claim 5, wherein the sleep state is a deepest sleep state.

9. A system-on-a-chip (SoC), comprising:

at least one processor;

a global counter;

a register;

global counter control circuitry; and a plurality of power domains, including a first power domain supplying the global counter and a second power domain supplying the register, wherein during a sleep state the first power domain is off and the second power domain is on;

wherein the global counter control circuitry is configured to:

receive an indication of entry into the sleep state;

store a value from the global counter in the register in response to the indication of the entry into the sleep state;

receive an indication of exit from the sleep state;

store the value from the register in the global counter in response to the indication of the exit from the sleep state;

wherein the global counter control circuitry includes deep-sleep global counter control circuitry configured to:

convert the value from a binary format into a Gray Code format before the value is stored in the register;

convert the value from the Gray Code format into the binary format before the value is stored in the global counter;

wherein the deep-sleep global counter control circuitry is configured to be supplied by the first power domain and further configured to:

capture the value from the register in response to a restoration of power to the first power domain;

convert a captured value from the Gray Code format into the binary format after the restoration of power to the first power domain;

disable the global counter after the restoration of power to the first power domain;

load the value in the binary format into the global counter; and enable the global counter to continue counting from a loaded value.

10. The system of claim 9, wherein the SoC is coupled to a dynamic random access memory (DRAM) configured to be supplied by the second power domain when the DRAM is in a self-refresh mode during the sleep state.

11. The system of claim 9, wherein:

the global counter control circuitry is configured to receive the indication of entry into the sleep state from a power management integrated circuit (PMIC) coupled to the SoC; and the global counter control circuitry is configured to receive the indication of exit from the sleep state from the PMIC.

12. The system of claim 9, wherein the sleep state is a deepest sleep state.

\* \* \* \* \*